United States Patent [19]

Nishizawa et al.

[11] Patent Number: 4,586,801
[45] Date of Patent: May 6, 1986

[54] MODE CHANGING MECHANISM FOR PRE-WINDING TYPE PHOTOGRAPHIC CAMERA

[75] Inventors: Tetuo Nishizawa; Seiji Asano; Minoru Ishiguro; Masanoshin Komori; Takashi Tobioka; Toshio Yoshida, all of Ohmiya; Hiroshi Hara, Tokyo, all of Japan

[73] Assignee: Fuji Photo Film Co., Ltd., Tokyo, Japan

[21] Appl. No.: 658,480

[22] Filed: Oct. 9, 1984

[30] Foreign Application Priority Data

Oct. 12, 1983 [JP] Japan ................................ 58-190338
Oct. 12, 1983 [JP] Japan ................................ 58-190339

[51] Int. Cl.$^4$ .............................................. G03B 1/18
[52] U.S. Cl. .................................. 354/173.1; 354/213; 354/214
[58] Field of Search ............... 354/173.1, 173.11, 214, 354/207, 206, 213

[56] References Cited

U.S. PATENT DOCUMENTS 4,460,256  7/1984  Araki et al. .................... 354/214 X
4,504,131  3/1985  Kimura .......................... 354/214 X
4,506,965  3/1985  Kitajima et al. ................. 354/214

*Primary Examiner*—William B. Perkey
*Attorney, Agent, or Firm*—Pasquale A. Razzano

[57] ABSTRACT

A pre-winding type photographic camera is provided with a mode changing mechanism for changing its operational mode between a pre-winding mode in which film is drawn out from a film magazine loaded in the camera and is taken up around the spool of the camera prior to photographing, and photographing mode in which the film is rewound into the film magazine by one frame each time the film is exposed. The mode changing mechanism is arranged to set the operational mode to the pre-winding mode by, in response to the opening of the backlid of the camera, bringing a mode changing member to a pre-winding mode position, and at the same time causing a force to be charged for bringing the mode changing member to a photographing mode position, and by retaining the mode changing member in the pre-winding mode position in response to the opening of the backlid of the camera, and is arranged to change the operational mode to the photographing mode by releasing the mode changing member in response to completion of the pre-winding mode operation, thereby permitting the mode changing member to move to the photographing mode position under the charged force. The mode changing mechanism is further provided with a magazine switch which is closed in response either to insertion or removal of the magazine and is kept closed until it is opened in response to the opening of the backlid of the camera. The magazine switch is inserted into the energizing circuit of the driving motor for driving the film in the pre-winding mode operation in series with the driving motor.

5 Claims, 14 Drawing Figures

F I G. 10
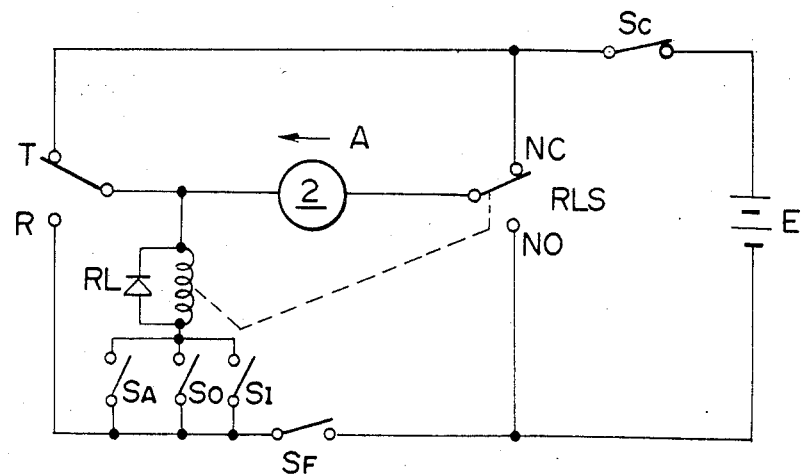
F I G. 11
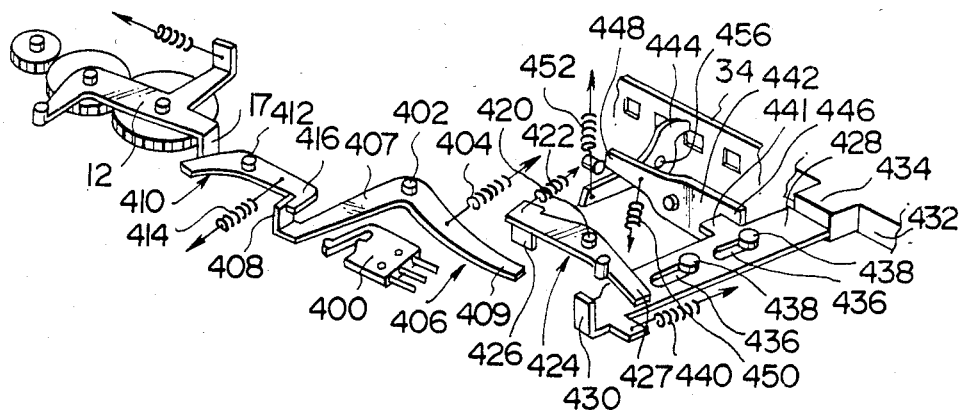

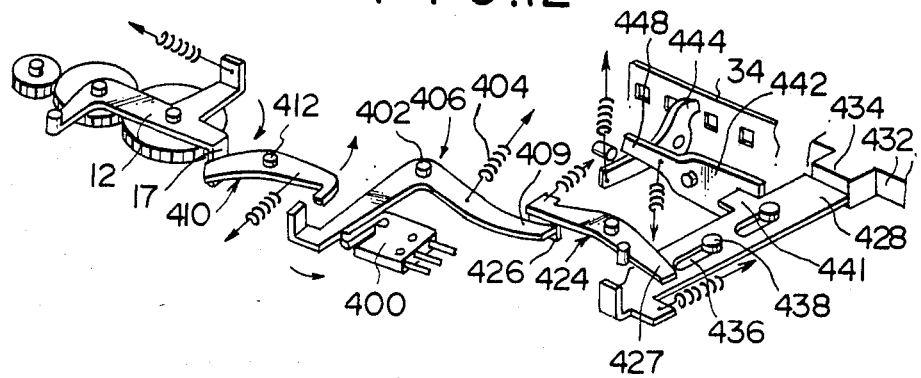
F I G. 12
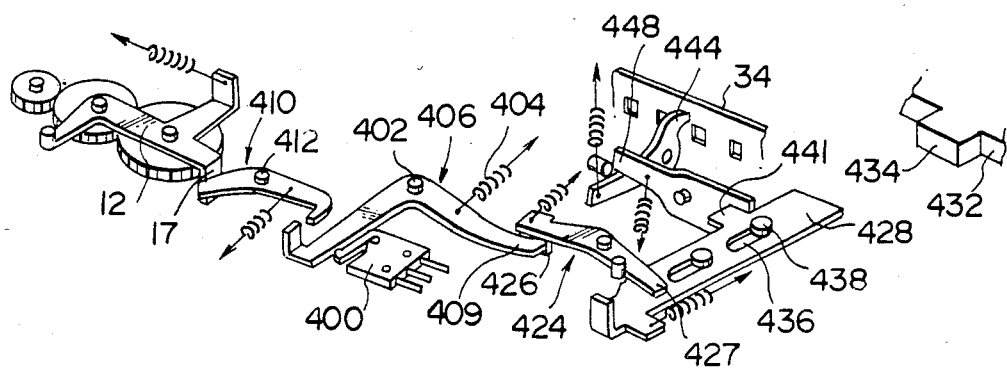
F I G. 13
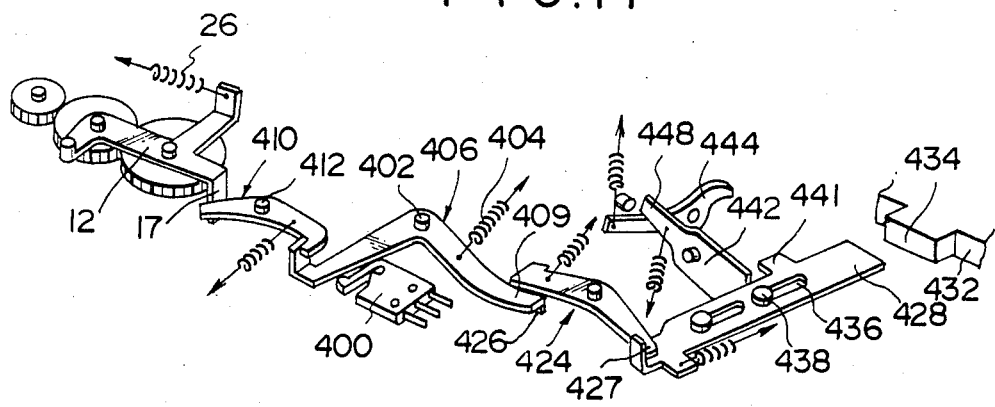
F I G. 14

MODE CHANGING MECHANISM FOR PRE-WINDING TYPE PHOTOGRAPHIC CAMERA

BACKGROUND OF THE INVENTION

1. Field of the Invention

This invention relates to a so-called pre-winding type photographic camera in which the whole of the film in a film magazine loaded in the camera is taken up once around the film take-up spool of the camera (pre-winding mode operation) and the film is then rewound into the magazine by one frame each time a picture is taken (photographing mode operation), and more particularly to a mode changing mechanism for such a pre-winding type photographic camera.

2. Description of the Prior Art

In the pre-winding type photographic camera, a mode changing mechanism for changing the operational mode of the camera from the pre-winding mode operation to the photographing mode operation is required. In order to automatically actuate the mode changing mechanism, means for charging the mode changing mechanism with actuating force becomes necessary. There has been proposed a pre-winding type photographic camera in which the actuating force is manually produced. However, such camera is disadvantageous in that the user is apt to forget to charge which could result in missing a shutter chance, or the user can mistake the inactiveness of the camera due to his forgetting to charge for a mechanical failure and open the backlid and spoil the film.

Thus there has been proposed a system in which the charging is accomplished in response to opening and closure of the backlid. However, this system gives rise to a problem that when the backlid is opened and closed by mistake while the camera is in the photographing mode state, the mode is changed to the pre-winding mode to wind the exposed part of the film, i.e., the part which has been rewound into the magazine, around the take-up spool, thereby causing the possibility of double exposure.

In order to avoid the possibility that the mode is changed when the backlid is opened by mistake, there has been proposed a system in which the charging is accomplished in response to insertion of the film magazine and accordingly the operational mode cannot be changed when the backlid is opened by mistake unless the magazine is once taken out and then inserted again. However, this system is disadvantageous in that the magazine is always in contact with a member by way of which the mode changing mechanism actuating force is charged, and accordingly it is difficult to keep the correct position of the magazine due to the pressure exerted on the magazine from the member.

SUMMARY OF THE INVENTION

In view of the foregoing observations and description, the primary object of the present invention is to provide an improved mode changing mechanism for a pre-winding type photographic camera in which the pre-winding can be effected automatically simply by loading a film magazine in the camera and closing the backlid, and at the same time the exposed part of the film can be protected even if the backlid is accidentally opened in the photographing mode, and which does not adversely affect the position of the film magazine or the film itself.

The mode changing mechanism in accordance with one aspect of the present invention is provided with a magazine switch which is closed in response either to insertion of a film magazine into the magazine chamber of the camera or to removal of the same from the magazine chamber, and is opened in response to opening of the backlid of the camera. The magazine switch is inserted into the circuitry for energizing the driving motor in the pre-winding mode in series with the driving motor.

In this mode changing mechanism, the driving motor cannot be energized when the backlid is accidentally opened and subsequently closed during photographing mode operation unless the magazine is once removed to close the magazine switch and accordingly there is no possibility that the exposed part of the film which has been rewound into the magazine is again drawn out from the magazine, whereby the exposed part of the film can be protected.

The mode changing mechanism in accordance with another embodiment of the present invention is arranged so that when the backlid is accidentally opened and then closed, the film is taken up once around the spool in response to the closure of the backlid and then automatically rewound into the magazine.

BRIEF DESCRIPTION OF THE DRAWINGS

FIG. 10 is a circuit diagram of the control circuit of a mode changing mechanism in accordance with a third embodiment of the present invention, FIG. 11 is a perspective view showing the mode changing section of the mode changing mechanism of the third embodiment in the pre-winding mode state with the backlid being closed and film being in the film feed path, FIG. 12 is a perspective view showing the same in the photographing mode state with the backlid being closed and film being in the film feed path, FIG. 13 is a perspective view showing the same in the photographing mode state but with the backlid being opened with film being in the film feed path, and FIG. 14 is perspective view showing the same in the pre-winding mode state with the backlid being opened and film not being in the film feed path.

DESCRIPTION OF THE PREFERRED EMBODIMENT

Now an example of a pre-winding type photographic camera incorporating therein a mode changing mechanism in accordance with an embodiment of the present invention will be described in detail with reference to FIGS. 1 to 8.

Figure 8:
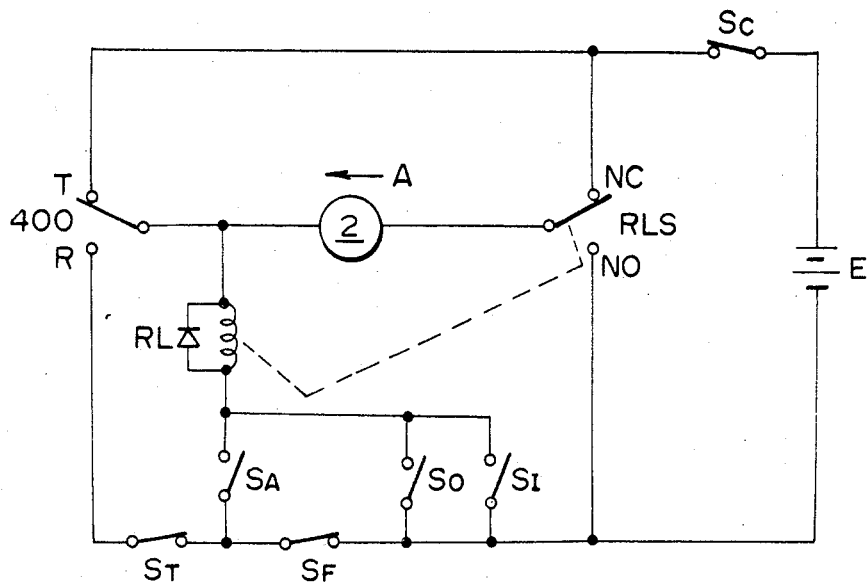
FIG. 8 is a circuit diagram of the control circuit of the first embodiment.

FIG. 8 is a circuit diagram of the control circuit of the pre-winding type camera of this example. In FIG. 8, reference characters E and Sc respectively denote a power source and a backlid switch which is opened and closed in response to opening and closure of the backlid of the camera. Reference numeral 2 denotes a driving motor for driving film both in the pre-winding mode operation and in the photographing mode operation. That is, the driving motor 2 is rotated in one direction (the counterclockwise direction in FIG. 1) to wind the film around the take-up spool of the camera in the pre-winding mode operation, and in the other direction to rewind the film into the magazine in the photographing mode operation. The direction of rotation of the driving motor 2 is changed by changing the direction of electric current flowing through the driving motor 2. Reference characters RL and RLS respectively denote a relay and a relay switch. The relay switch RLS has a movable contact selectively connected to a normally closed contact NC and normally open contact NO. That is, when the relay RL is not energized, the movable contact is in contact with the normally closed contact NC and when the relay RL is energized the movable contact is brought into contact with the normally open contact NO. A mode changing switch 400 has a movable contact selectively connected to a pre-winding mode contact R and a photographing mode contact T. The mode changing switch 400 is mechanically switched between a photographing mode connection in which the movable contact is in contact with the photographing mode contact T and a pre-winding mode connection in which the movable contact is in contact with the pre-winding mode contact as will be described later. Reference character $S_T$ denotes a magazine switch which is closed in response either to insertion of the magazine into the magazine chamber or removal of the same therefrom, and is opened in response to opening of the backlid of the camera, the mechanical arrangement for actuating the magazine switch $S_T$ being described later. Reference numerals $S_F$, $S_O$ and $S_I$ respectively denote a film detecting switch which is closed when it detects film, a one-frame switch for rewinding the film one frame by one frame in the photographing mode, and a lost-feed switch for spacing the first frame of the film away from the magazine at least by one frame-length so that the first frame is not accidentally cut when the film is drawn out from the magazine to be severed therefrom in a laboratory. The reference character $S_A$ denotes a manual rewinding switch which is manually closed to rewind the film into the magazine.

The mode changing mechanism of this embodiment is arranged so that when the film magazine is inserted into the magazine chamber and the backlid is closed, the driving motor 2 is energized to automatically perform the pre-winding of the film, and when the pre-winding of the film is completed, the operational mode is automatically changed to the photographing mode with the film being automatically rewound into the magazine by substantially one frame-length in advance (lost-feed), and in the event that the backlid is accidentally opened in the photographing mode, the driving motor is prevented from being energized when the backlid is subsequently closed except when the manual rewinding switch $S_A$ is manually closed to rewind the film.

That is, the mechanism is arranged to actuate the switches so that an electrical circuitry for permitting electric current to flow through the driving motor 2 in the direction of the arrow A in FIG. 8 is established when the film magazine is inserted and the backlid is closed, said magazine switch $S_T$ being connected in series with the driving motor 2 in this circuitry, and an electrical circuitry for permitting electric current to flow through the driving motor 2 in the direction opposite to the arrow A is established upon completion of the pre-winding, and further neither circuitry is established when the backlid is opened or closed in the photographing mode except that the latter curcuitry is established when the manual rewinding switch $S_A$ is closed.

The mechanism for actuating the switches in the desired manner and for obtaining the desired function of the camera will be described hereinbelow in detail with reference to FIGS. 1 to 7.

Figure 1:
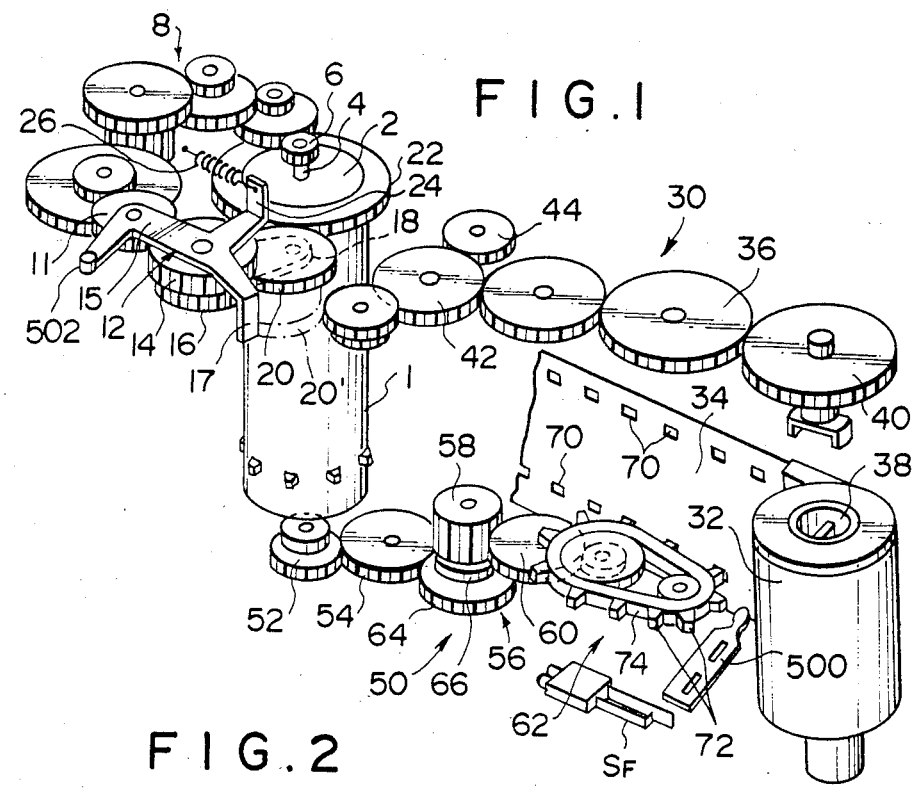
FIG. 1 is a perspective view showing the film driving mechanism of a pre-winding type photographic camera incorporating therein a mode changing mechanism in accordance with a first embodiment of the present invention.

As shown in FIG. 1, the camera is provided, as the film driving mechanism with a take-up spool 1, a driving motor 2 disposed inside the take-up spool 1, an output gear 6 fixed to the output shaft 4 of the driving motor 2 and reduction gears 8 in engagement with the output gear 6. The film driving mechanism further includes a torque detecting lever 12 and an arm member 18 which are coaxially supported for rotation with first and second sun gears 14 and 16. The first and second sun gears 14 and 16 are formed integrally with each other. The torque detecting lever 12 has a first arm portion 15 for rotatably supporting a first planet gear 11 adapted to be engaged with the first sun gear 14, an urging arm portion 24 to which is attached an end of a coil spring 26 for urging the torque detecting lever 12 in the counterclockwise direction as seen in FIG. 1, and a working arm 17 adapted to be engaged with a retainer lever 410 (to be described later). The arm member 18 supports a second planet gear 20 for rotation, and the second planet gear 20 is in engagement with a driving gear 22 of the spool 1 in the pre-winding mode state of the system shown in FIG. 1.

When the driving motor 2 is energized in the pre-winding mode to rotate in the counterclockwise direction in FIG. 1, film 34 in a film magazine 32 is wound up around the spool 1, that is, the pre-winding is performed. When the film 34 is completely fed out from the magazine 32, the spool 1 is stopped from rotating under the tension of the film 34 and accordingly the first and second sun gears 14 and 16 stop. This causes the first planet gear 11 to roll about the first sun gear 14 in the clockwise direction to be disengaged from the reduction gears 8, whereby the driving force of the driving motor 2 is prevented from being transmitted to the spool 1. At the same time, the torque detecting lever 12 is rotated in the clockwise direction overcoming the force of the coil spring 26.

When the operational mode is subsequently changed to the photographing mode under the control of the control circuit shown in FIG. 8, the driving motor 2 is energized to rotate in the clockwise direction. In the photographing mode, the driving force of the driving motor 2 is transmitted to transmission gears 30 by way of the reduction gears 8, the first planet gear 11, the first and second sun gears 14 and 16, and the second planet gear 20 in the position shown by the chained line 20'. (The second planet gear 20 is moved to the position at the beginning of clockwise rotation of the driving motor 2.) The last gear 36 in the transmission gears 30 is engaged with a magazine driving gear 40 for driving the film spool 38 of the magazine 32. One gear 42 in the transmission gears 30 is engaged with a counter driving gear 44 for driving a frame counter system. Each time the shutter release button (not shown) is depressed, the driving motor 2 is energized to rotate the film spool 38 through a predetermined angle to rewind the film 34 by one frame-length by way of magazine driving gear 40.

Adjacent to the lower side of the film feeding path is disposed a film feeding device 50 for feeding the leader portion of the film 34 to the spool 1 in the beginning of the pre-winding operation. The film feeding device 50 comprises a gear 52 mounted on the lower end of the spool 1, an idle gear 54 in engagement with the gear 52, a one-way gear mechanism 56 in engagement with the idle gear 54, another idle gear 60 in engagement with an output gear 58 of the one-way gear mechanism 56, and a driving belt mechanism 62 driven by the idle gear 60. The driving belt mechanism 62 includes a belt 74 having a plurality of projections 72 which is adapted to be engaged with perforations 70 of the film 34, and the belt 74 is arranged to run in parallel to the film 34. The one-way gear mechanism 56 comprises an input gear 64 and the output gear 58 connected with each other by way of a one-way clutch 66.

When the film magazine 32 is loaded in the camera and the pre-winding mode operation is initiated, the driving motor 2 is energized to rotate the spool 1 and to drive the driving belt mechanism 62 by way of the gear 52, whereby the driving belt mechanism 62 feeds the film 34 by way of the engagement of the perforations 70 and the projections 72 of the belt 74. When the leading end of the leader portion of the film 34 reaches the spool 1, the leader portion of the film 34 is automatically wound around the spool 1 by an automatic winding device which is well known and therefore not shown. Once the leader portion of the film 34 is wound around the spool 1, the film 34 is taken up around the spool 1 without interference from the driving belt mechanism 62 since the driving belt mechanism 62 is driven by way of the one-way gear mechanism 56.

Figure 2:
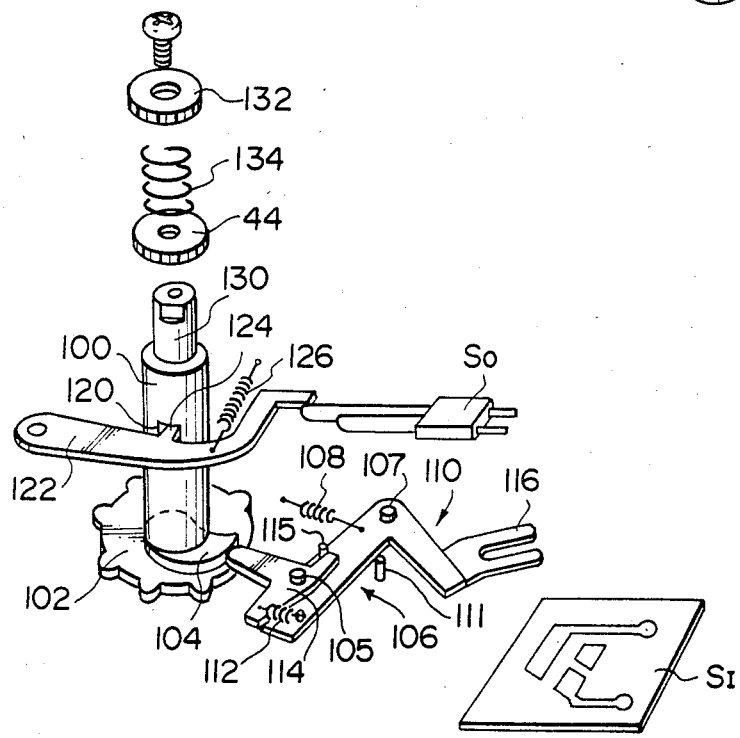
FIG. 2 is a perspective view showing the mechanism for actuating the lost-feed switch and the one-frame switch employed in the mode changing mechanism of the first embodiment.

The camera is further provided with a frame feed mechanism for rewinding the film 34 into the magazine 32 one frame by one frame each time a picture is taken and for performing lost-feed in order to space the first frame (the portion of the film 34 to be first exposed) away from the magazine 32 by at least one frame-length so that the first frame is not accidentally cut when the film 34 is drawn out from the magazine 32 to be severed therefrom in a laboratory. Further, the frame feed mechanism delivers a frame number output to the counter system. The frame mechanism comprises, as shown in FIG. 2, a sprocket shaft 100 mounted for rotation on the camera body (not shown), and a sprocket 102 fixed to the lower end of the sprocket shaft 100. The sprocket 102 is disposed to be engaged with the perforations 70 of the film 34 so that the sprocket shaft 100 is rotated in response to the film feed.

Said lost-feed switch $S_I$ is actuated by a lost-feed switch actuating mechanism comprising a cam member 104 fixedly mounted on the upper surface of the sprocket 102 and a swing arm assembly 106 in engagement with the cam member 104. The swing arm assembly 106 comprises a first swing member 110 supported for rotation on a pin 107 and a second swing member 114 supported for rotation on a pin 105 fixed to one arm portion of the first swing member 110. The first swing member 110 is urged in the clockwise direction in FIG. 2 by a coil spring 108 and clockwise rotation of the first swing member is limited by a stop pin 111. The second swing member 114 is urged in the counterclockwise direction with respect to the first swing member 110 by a coil spring 112 and the counterclockwise rotation of the second swing member 114 is limited by a stop pin 115. A switch connecting piece 116 is fixed to the other arm portion of the first swing member 110. The swing arm assembly 106 is arranged so that the switch connecting piece 116 slid on the lost-feed switch $S_I$ to close it when the cam member 104 does not act upon the first swing member 110 and the first swing member 110 is accordingly permitted to abut against the stop pin 111 under the force of the coil spring 108.

The sprocket 102 is disposed to be rotated in the counterclockwise direction in FIG. 2 during the pre-winding mode operation. In the pre-winding mode operation, counterclockwise rotation of the cam member 104 together with the sprocket 102 in response to the pre-winding of the film 34 cannot swing the first swing member 110 but can only swing the second swing member about the pin 105 on the first swing member 110, whereby the lost-feed switch $S_I$ is kept closed. On the other hand when the operational mode is changed to the photographing mode, clockwise rotation of the cam member 104 together with the sprocket 102 (as will be apparent, the sprocket 102 is rotated in the clockwise direction when the film 34 is rewound) first causes the second swing member 114 to swing about the pin 105 to abut against the stop pin 115. When the second swing member 114 abuts against the stop pin 115, the second swing member 114 is operatively fixed with respect to the first swing member 110, and accordingly further clockwise rotation of the cam member causes the first swing member, by way of the second swing member 114, to swing in the counterclockwise direction, thereby sliding the switch connecting piece 116 to open the lost-feed switch $S_I$. As will be described later, the lost-feed switch $S_I$ is opened immediately before said one-frame switch $S_O$ is opened.

If the second swing member 114 is away from the stop pin 115 being pushed clockwisely by the cam member 104 upon completion of the pre-winding mode operation, the initial clockwise rotation of the cam member 104 in the subsequent photographing mode can only permit the second swing member 114 to rotate with respect to the first swing member 110 under the force of the coil spring 112 until abutting against the stop pin 115 and cannot cause rotation of the first swing member 110, whereby the lost-feed switch $S_I$ is kept closed for the initial stage of the clockwise rotation of the cam member 104. The lost-feed switch $S_I$ is not opened until the cam member 104 makes substantially one revolution to rotate the first swing member 110 in the counterclockwise direction by way of the second swing member 114. That is, in the beginning of the photographing mode operation, the lost-feed switch $S_I$ is opened after the sprocket 102 is rotated by an angle slightly larger than 360°, more strictly the sum of the angle by which it is rotated to bring the second swing member 114 into abutment against the stop pin 115 and the angle by which it is subsequently rotated to swing the first swing member 110 by way of the second swing member 114 to move the switch connecting piece 116 to open the lost-feed switch $S_I$ (about 300°). Thus, the lost-feed switch $S_I$ is opened after the film 34 is rewound by one frame-length.

On the other hand, when the second swing member 114 is in abutment against the stop pin 115 without being pushed by the cam member 104, clockwise rotation of the cam member 104 immediately causes the first swing member 110 to swing in the counterclockwise direction and the switch connecting piece 116 is moved to open the lost-feed switch $S_I$ immediately before the one-frame switch $S_O$ is opened.

The one-frame switch $S_O$ is actuated by a one-frame switch actuating mechanism comprising an actuator arm 122 which is counterclockwisely urged by a coil spring 126 and is provided with a projection 124 at an intermediate portion thereof, and a recess 120 formed in the sprocket shaft 100 to be engaged with the projection 124 of the actuator arm 122. The free end of the projection 124 is kept in abutment against the peripheral surface of the sprocket shaft 100 under the force of the coil spring 126. When the projection 124 is in abutment against the peripheral surface of the sprocket shaft 100, the one-frame switch $S_O$ is kept closed by way of the engagement with the actuator arm 122. On the other hand when the projection 124 falls into the recess 120 in the sprocket shaft 100, the actuator arm 122 is disengaged from the one-frame switch $S_O$ to open the same. Thus the one-frame switch $S_O$ is opened each time the film 34 is fed by one frame-length and the sprocket shaft 100 makes one revolution.

Though the lost-feed switch $S_I$ and the one-frame switch $S_O$ are arranged to be substantially simulataneously opened in the photographing mode in which the film 34 is rewound, the one-frame switch $S_O$ is adjusted to be opened slightly later than the lost-feed switch $S_I$ as described above. As shown in FIG. 8 and as will be described in detail later, the one-frame switch $S_O$ and the lost-feed switch $S_I$ are connected in parallel in the control circuit. Since the one-frame switch $S_O$ is opened later than the lost-feed switch $S_I$, the time the parallel connection of the one-frame switch $S_O$ and the lost-feed switch $S_I$ is opened, i.e., the time when both the switches are opened, is the time the one-frame switch $S_O$ is opened.

Further, as can be understood from the description above, if the second swing member 114 is swung by the cam member 104 at the time when the pre-winding mode operation is completed, the lost-feed switch $S_I$ is kept closed when the one-frame switch $S_O$ is first opened. That is, the parallel connection of the switches $S_O$ and $S_I$ is kept closed to energize the driving motor 2 until the one-frame switch $S_O$ is next opened. Accordingly, in this case, the film 34 is rewound by one frame-length and a fraction thereof. On the other hand if the second swing member 114 is brought into abutment against the stopper pin 115 without being pushed by the cam member 104 upon completion of the pre-winding mode operation, the parallel connection of the switches $S_O$ and $S_I$ is opened to de-energize the driving motor 2 when the one-frame switch $S_O$ is first opened and accordingly the film 34 is rewound by substantially one frame-length.

The sprocket shaft 100 has a small diameter portion 130 at its upper end portion, and said counter driving gear 44 (FIG. 1) is supported for rotation on the small diameter portion 130. A counter gear 132 for transmitting driving force to the counter system is fixed to the top of the small diameter portion 130 above the counter driving gear 44. A spring 134 is interposed between the counter driving gear 44 and the counter gear 132 so that the gears 44 and 132 and the spring 134 together form a friction clutch. The counter driving gear 44 transmits driving force to the sprocket shaft 100.

Figure 3:
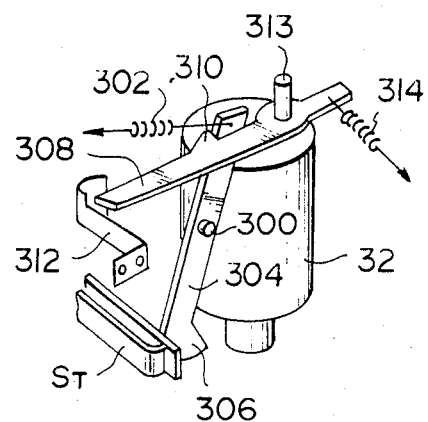
FIG. 3 is a perspective view showing the magazine lever and the magazine switch employed in the mode changing mechanism of the first embodiment with the magazine lever in the detecting position.
Figure 4:
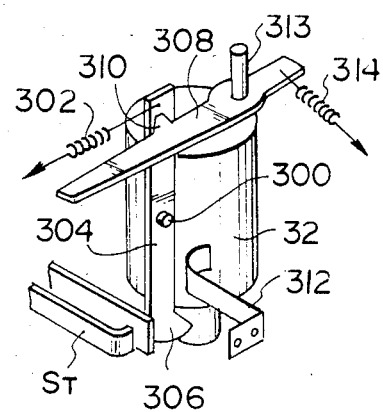
FIG. 4 is a view similar to FIG. 3 but with the magazine lever in the rest position.

FIGS. 3 and 4 show a magazine detecting mechanism. A magazine lever 304 is mounted for rotation on a pin 300 in the camera body and is counterclockwisely urged by a coil spring 302 attached to one end thereof. The magazine lever 304 is provided with a projection 306 at its lower end and is disposed so that the projection 306 is adapted to abut against the peripheral surface of the magazine 32 when the magazine 32 is inserted into or taken out from the magazine chamber. The magazine lever 304 is moved to the position shown in FIG. 3 (This position will be referred to as "the detecting position" hereinbelow.) pushed by the film magazine 32 when it is inserted into or taken out from the magazine chamber, and held in the detecting position until the backlid is thereafter opened as will be described hereinbelow. Then the backlid is opened the magazine lever 304 is moved to the position shown in FIG. 4 (This position will be referred to as "the rest position" hereinbelow.). When the magazine lever 304 is in the detecting position, a magazine switch $S_T$ is closed, and while the magazine lever 304 is in the rest position, the magazine switch $S_T$ is opened.

Said one end of the magazine lever 304 to which the coil spring 302 is attached is adapted to be engaged with a projection 310 provided on a retainer lever 308 at an intermediate portion thereof. The retainer lever 308 is supported for rotation on a pin 313 and is urged in the clockwise direction by a coil spring 314. When the magazine lever 304 is moved to the detecting position shown in FIG. 3 upon insertion or removal of the magazine 32, said one end portion of the magazine lever 304 slides over the projection 310 of the retainer lever 308 to be engaged therewith, whereby the magazine lever 304 is retained in the detecting position. Since the magazine lever 304 is retained by the retainer lever 308, normally almost no force is exerted on the magazine 32 from the magazine lever 304. This is advantageous in that the magazine lever 304 does not adversely affect the position of the magazine 32.

The end portion of the retainer lever 308 on the side on which said projection 310 is formed is adapted to be engaged with a backlid spring member 312 fixed to the backlid (not shown) of the camera body. Upon closure of the backlid, the backlid spring member 312 overrides the end portion of the retainer lever 308 to be engaged therewith. When the backlid is opened thereafter, the backlid spring member 312 pulls the end portion of the retainer lever 308 to swing the retainer lever 308 in the counterclockwise direction, whereby the magazine lever 304 is released from the retainer lever 308 and is moved to the rest position shown in FIG. 4 under the force of the spring 302.

Figure 5:
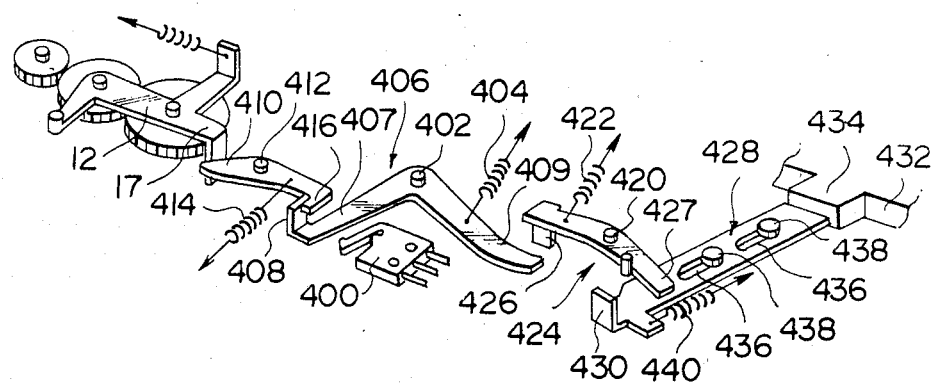
FIG. 5 is a perspective view showing the mode changing section of the mode changing mechanism of the first embodiment in the pre-winding mode state with the backlid of the camera being closed.
Figure 6:
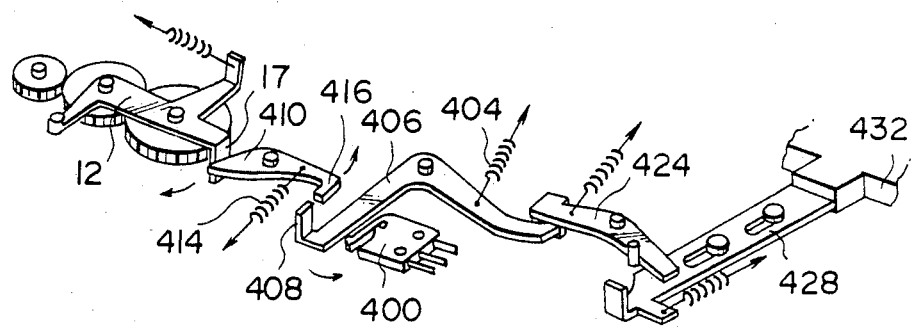
FIG. 6 is a perspective view of the mode changing section of FIG. 5 but in the photographing state with the backlid closed.
Figure 7:
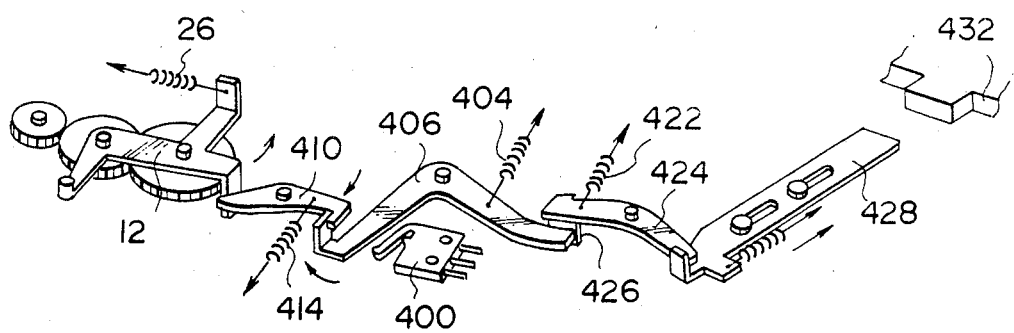
FIG. 7 is a perspective view similar to FIG. 6 but the backlid is opened.

Now referring to FIGS. 5 to 7, the mode changing section for changing the operational mode will be described in detail. FIG. 5 shows the mode changing section in the pre-winding mode state with the backlid of the camera being closed, FIG. 6 shows the same in the photographing mode state with the backlid closed and the FIG. 7 shows the same in the photographing mode state with the backlid being open.

The mode changing section includes said mode changing switch 400 and an L-shaped mode changing lever 406 which is supported for rotation on a pin 402 and urged by a coil spring 404 in the counterclockwise direction as seen in FIG. 5.

The mode changing lever 406 has first and second arm portions 407 and 409, and is movable between a photographing mode position in which the first arm portion 407 pushes the mode changing switch 400 to make said photographing mode connection and a pre-winding mode position in which the first arm portion 407 is swung away from the mode changing switch 400 to release the same, thereby making said pre-winding mode connection.

A projection 408 is provided on the free end of the first arm portion 407 of the mode changing lever 406, and the projection 408 is adapted to be engaged with a projection 416 on one end of said retainer lever 410 when the mode changing lever 406 is in the pre-winding mode position. The retainer lever 410 is supported for rotation on a pin 412 and is clockwisely urged by a coil spring 414. The other end of the retainer lever 410 is adapted to be engaged with said working arm 17 of the torque detecting lever 12.

The second arm portion 409 of the mode changing lever 406 is adapted to be engaged with a downward projection 426 on one end of a charge lever 424 which is supported for rotation on a pin 420 and is urged in the clockwise direction as seen in FIG. 5 by a coil spring 422. The other end 427 of the charge lever 424 is adapted to be engaged with a projection 430 on one end of a charging slider 428. The charging slider 428 is urged toward the backlid 432 by a coil spring 440 and is adapted to abut against a raised portion 434 formed on the backlid 432 when the backlid 432 is closed. The charging slider 428 is provided with a pair of elongated slots 436 and a pair of pins 438 are inserted into the slots 436, whereby the sliding direction and the sliding distance of the slider 428 are determined by the slots 436.

Though not clearly shown in FIG. 1, while the film 34 is wound around the spool 1, i.e., during the pre-winding mode operation, the working arm 17 of the torque detecting lever 12 abuts against the retainer lever 410 to hold it in the position shown in FIG. 5. Therefore, the mode changing switch 400 is released and its connection is in the pre-winding mode connection state since the mode changing lever 406 is held in the pre-winding mode position by way of the engagement between the projections 408 and 416. As described above, FIG. 5 shows the state when the backlid 432 is closed. As described above in conjunction with FIG. 1, when the pre-winding of the film 34 is completed and the spool 1 is stopped, the torque detecting lever 12 is rotated in the clockwise direction as seen in FIGS. 1 and 6, and accordingly the retainer lever 410 is counterclockwisely rotated pushed by the working arm 17 of the torque detecting lever 12 overcoming the force of the spring 414 as shown in FIG. 6. Therefore, the projection 416 of the retainer lever 410 is disengaged from the projection 408 of the mode changing lever 406 to release it, whereby the mode changing lever 406 is permitted to counterclockwisely rotate under the force of the coil spring 404 and to push the mode changing switch 400 into the photographing mode connection.

When the backlid 432 is opened during the photographing mode operation, said backlid switch $S_C$ is opened and the driving motor 2 is stopped. When the driving motor 2 is stopped, the torque detecting lever 12 is counterclockwisely rotated under the force of the coil spring 26 and the retainer lever 410 is clockwisely rotated under the force of the coil spring 414 to the position shown in FIG. 7 in which it can be engaged with the mode changing lever 406 to retain the same in the pre-winding mode position. Further, since the raised portion 434 of the backlid 432 is retracted from the slider 428 upon opening of the backlid 432 the charging slider 428 slides under the force of the coil spring 440 to rotate the charge lever 424 in the counterclockwise direction overcoming the force of the coil spring 422. Then the downward projection 426 of the charge lever 424 pushes the mode changing lever 406 to bring it into the pre-winding mode position. The mode changing lever 406 is held in the pre-winding mode position by the retainer lever 410, whereby the connection of the mode changing switch 400 is changed to the pre-winding mode connection.

Said film detecting switch $S_F$ is disposed near the film feed path and detects whether or not the film exists in the film feed path by way of a contact piece 500 as shown in FIG. 1. The film detecting switch $S_F$ is closed when the film exists in the path.

When the backlid 432 is opened with the magazine having been removed, the mode changing switch 400 is in the pre-winding mode connection. At this time, the magazine switch $S_T$ is closed since the magazine lever 304 was brought into the detecting position shown in FIG. 3 when the magazine 32 was removed, and has been kept in the detecting position by the retainer lever 308. If the backlid 432 is closed without loading a new magazine and is thereafter opened in order to load a new magazine, for instance, the magazine lever 304 is moved to the rest position shown in FIG. 4 thereby opening the magazine switch $S_T$ as described above. However when a new magazine is loaded thereafter, the magazine lever 304 is brought into the detecting position and held in that position, whereby the magazine switch $S_T$ is closed.

When the backlid is closed after a new magazine is loaded, the mode changing lever 406 is moved to the pre-winding mode position whereby the movable contact of the mode changing switch 400 is brought into contact with the pre-winding mode contact R (the pre-winding mode connection), and at the same time, the backlid switch $S_C$, the film detecting switch $S_F$ and the magazine switch $S_T$ are all closed. Accordingly, an electric current is supplied to the driving motor 2 in the direction of the arrow A in FIG. 8 to rotate the driving motor 2 in the counterclockwise direction by way of the backlid switch $S_C$, the normally closed contact NC of the relay switch RLS, the pre-winding mode contact R of the mode changing switch 400, the magazine switch $S_T$ and the film detecting switch $S_F$, whereby the pre-winding is performed.

When the pre-winding is completed, the spool 1 is stopped under the tension of the film 34, and the torque detecting lever 12 is rotated in the clockwise direction in FIG. 1 to counterclockwisely rotate the retainer lever 410, thereby permitting the mode changing lever 406 to move to the photographing mode position as described above. Thus, the movable contact of the mode changing switch 400 is brought into contact with the photographing mode contact T (the photographing mode connection), whereby the relay RL is energized to bring the movable contact of the relay switch RLS into contact with the normally open contact NO thereof since the one-frame switch $S_O$ and the lost-feed switch $S_I$ are closed at the time. Accordingly, an electric current is supplied to the driving motor 2 in the direction opposite to the arrow A in FIG. 8 by way of the backlid switch $S_C$, the photographing mode contact T of the mode changing switch 400 and the normally open switch NO of the relay switch RLS, whereby the motor 2 is rotated in the clockwise direction. The driving motor 2 is stopped when the lost-feed switch $S_I$ and the one-frame switch $S_O$ are opened, whereby the film 34 is rewound by substantially one-frame length (the lost-feed) as described above. Thereafter, the one-frame switch $S_O$ is closed in response to shutter release so that the film 34 is rewound into the magazine by one frame each time the film 34 is exposed.

When the backlid is accidentally opened in the photographing mode operation, the mode changing lever 406 is moved to the pre-winding mode position and held in the position by the retainer lever 410, whereby the mode changing switch 400 is caused to make the pre-winding mode connection as described above. However, the driving motor 2 is not energized when the backlid is subsequently closed since the magazine lever 304 has moved to the resting position in response to opening of the backlid and therefore the magazine switch $S_T$ has been opened as described above. Therefore, the exposed part of the film 34 rewound into the magazine 32 is protected from being exposed again.

Then the whole film can be rewound into the magazine 32 by manipulating a control arm 502 projecting outside the camera body from the first arm portion 15 of the torque detecting lever 12 to clockwisely rotate the torque detecting lever 12 so that the retainer lever 410 is counterclockwisely rotated to release the mode changing lever 406, whereby the mode changing lever 406 is moved to the photographing mode position to cause the mode changing switch 400 to make the photographing mode connection, and by closing the manual rewinding switch $S_A$.

When all the frames of the film 34 are exposed and the whole film is rewound into the magazine, or when the manual rewinding switch $S_A$ is closed and the whole film is rewound into the magazine, the film detecting switch $S_F$ is opened to open the energizing circuit of the relay RL, whereby the movable contact of the relay switch RLS is moved away from the normally open contact NO to open the energizing circuit of the driving motor 2.

When the backlid is thereafter opened and the magazine is taken out, the magazine lever 304 is moved to the detecting position and is held there by the retainer lever 308 to close the magazine switch $S_T$ and at the same time the mode changing switch 400 makes the pre-winding mode connection as described above. However, since the film detecting switch $S_F$ is opened, the driving motor 2 cannot be energized even when the backlid is subsequently closed.

Figure 9:
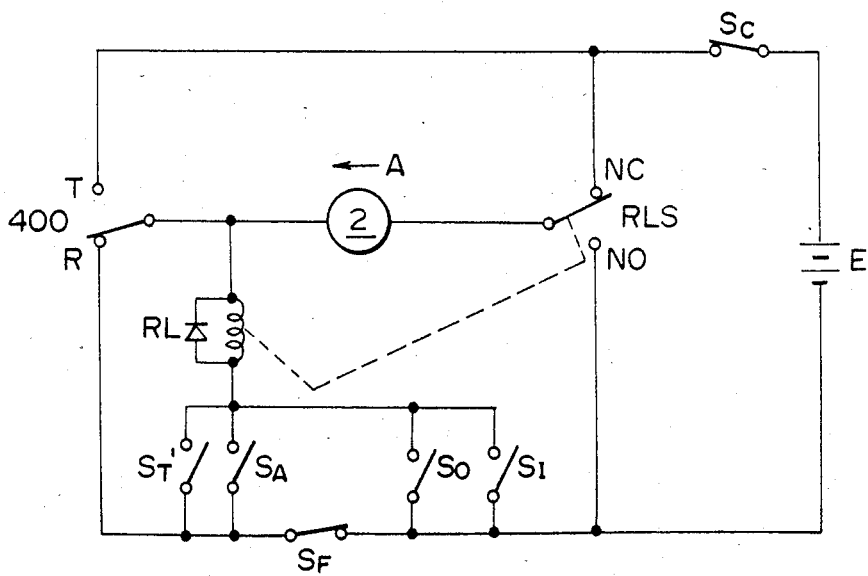
FIG. 9 is a circuit diagram of the control circuit of a mode changing mechanism in accordance with a second embodiment of the present invention.

FIG. 9 shows the control circuit of the pre-winding type photographic camera employing a mode changing mechanism in accordance with another embodiment of the present invention. Though the camera is disabled in the above embodiment when the backlid is accidentally opened and thereafter closed in the photographing mode state of the camera, the camera of this example is arranged so that when the backlid is accidentally opened and then closed, the film is taken up once around the spool and then automatically rewound into the magazine. The arrangement of this camera is the same as that of the above example except that the magazine switch (indicated at $S_T'$ in FIG. 9) is opened when the magazine lever 304 is in the detecting position shown in FIG. 3 and is closed when the same is in the rest position shown in FIG. 4 unlike the magazine switch in the above example, and the connection between the switches and the driving motors differs from that shown in FIG. 8. The function of the switches and the mechanism for actuating the switches are the same as those in the above embodiment with the exception of the magazine switch $S_T'$ and therefore the switches as well as the mechanical components with the exception of the magazine switch are indicated by the same reference characters or numbers as in FIGS. 1 to 8.

In the control circuit shown in FIG. 9, the magazine switch $S_T'$ which is closed in response to opening of the backlid and opened in response either to insertion or to removal of the magazine is disposed in the energizing circuit of the relay RL. The magazine switch $S_T'$ is in series with the film detecting switch $S_F$ which is closed when the film 34 exists in the film feed path and the series connection of the magazine switch $S_T'$ and the film detecting switch $S_F$ is connected to the relay RL in parallel to the one-frame switch $S_O$.

Referring to FIG. 9 together with FIGS. 1 to 7, when the backlid is closed after a new magazine is loaded, the mode changing lever 406 is moved to the pre-winding mode position whereby the movable contact of the mode changing switch 400 is brought into contact with the pre-winding mode contact R (the pre-winding mode connection), and at the same time, the backlid switch $S_C$ and the film detecting switch $S_F$ are closed. Accordingly, an electric current is supplied to the driving motor 2 in the direction of the arrow A in FIG. 9 to rotate the driving motor 2 in the counterclockwise direction by way of the backlid switch $S_C$, the normally closed contact NC of the relay switch RLS, the pre-winding mode contact R of the mode changing switch 400, and the film detecting switch $S_F$, whereby the pre-winding is performed.

When the pre-winding is completed, the spool 1 is stopped under the tension of the film 34, and the torque detecting lever 12 is rotated in the clockwise direction in FIG. 1 to counterclockwisely rotate the retainer lever 410, thereby permitting the mode changing lever 406 to move to the photographing mode position as described above. Thus, the movable contact of the mode changing switch 400 is brought into contact with the photographing mode contact T (the photographing mode connection), whereby the relay RL is energized to bring the movable contact of the relay switch RLS into contact with the normally open contact NO thereof since the one-frame switch $S_O$ and the lost-feed switch $S_I$ are closed at the time. Accordingly, an electric current is supplied to the driving motor 2 in the direction opposite to the arrow A in FIG. 8 by way of the backlid switch $S_C$, the photographing mode contact T of the mode changing switch 400 and the normally open switch NO of the relay switch RLS, whereby the motor 2 is rotated in the clockwise direction. The driving motor 2 is stopped when the lost-feed switch $S_I$ and the one-frame switch $S_O$ are opened, whereby the film 34 is rewound by substantially one frame-length (the lost-feed) as described above. Thereafter, the one-frame switch $S_O$ is closed in response to shutter release so that the film 34 is rewound into the magazine by one frame each time the film 34 is exposed.

When the backlid is accidentally opened in the photographing mode operation, the mode changing lever 406 is moved to the pre-winding mode position and held in the position by the retainer lever 410, whereby the mode changing switch 400 is caused to make the pre-winding mode connection as described above. When the backlid is subsequently closed, the driving motor 2 is energized to perform the pre-winding independent of the one-frame switch $S_O$ since the film detecting switch $S_F$ has been kept closed and the magazine switch $S_T'$ has been opened after the film was inserted into the camera since the backlid was closed. When the pre-winding is completed, the operational mode is automatically changed to the photographing mode in the manner described above. However, since the magazine switch $S_T'$ is closed this time, the motor 2 is not de-energized when the one-frame switch $S_O$ is opened and the film 34 continues to be rewound into the magazine until the film switch $S_F$ which is in series with the magazine switch $S_T'$ is opened. Thus the film 34 is automatically rewound into the magazine 32 when the backlid is opened and closed in the photographing mode state, whereby the exposed part of the film 34 is protected from being exposed again, i.e., the possibility of double exposure is avoided.

When all the frames of the film 34 are successfully exposed without the backlid being opened in the photographing mode state, the leader part of the film 34 can be drawn into the magazine 32 by manually closing the manual rewinding switch $S_A$. When the leader part of the film 34 is drawn into the magazine 32 the film detecting switch $S_F$ is opened to stop the driving motor 2.

When the backlid is thereafter opened and the magazine is taken out, the magazine lever 304 is moved to the detecting position and is held there by the retainer lever 308 to open the magazine switch $S_T'$ and at the same time the mode changing switch 400 makes the pre-winding mode connection as described above.

In another embodiment of the present invention shown in FIG. 10 to 14, the operational mode is not changed when the backlid of the camera is accidentally opened and then closed, and the original mode is continued when the backlid is closed unless the film has been completely rewound.

The embodiment shown in FIGS. 10 to 14 is mechanically the same as the embodiment shown in FIGS. 1 to 7 except that the magazine switch $S_T$ shown in FIGS. 3 and 4 is not provided in this embodiment, and instead a film detecting lever is provided in order to prevent the charging slider 428 from following the backlid 432 when the backlid 432 is opened in the photographing mode state. Further the control circuit of this embodiment shown in FIG. 10 is somewhat different from that shown in FIG. 8.

FIG. 11 shows the mode changing section in the pre-winding mode state with the backlid being closed and film being in the film feed path, FIG. 12 shows the same in the photographing mode state with the backlid being closed and film being in the film feed path, FIG. 13 shows the same in the photographing mode state but with the backlid being opened with film being in the film feed path, and FIG. 14 shows the same in the pre-winding mode state with the backlid being opened and film not being in the film feed path.

In FIGS. 10 to 14 and in the following description, the parts analogous to the parts in FIGS. 1 to 8 are given the same reference numerals or characters.

Like the mode changing section of the embodiment shown in FIGS. 1 to 8, the mode changing section of this embodiment includes the mode changing switch 400 and an L-shaped mode changing lever 406 which is supported for rotation on a pin 402 and urged by a coil spring 404 in the counterclockwise direction as seen in FIG. 11.

The mode changing lever 406 has first and second arm portions 407 and 409, and is movable between a photographing mode position in which the first arm portion 407 pushes the mode changing switch 400 to make said photographing mode connection and a pre-winding mode position in which the first arm portion 407 is swung away from the mode changing switch 400 to release the same, thereby making said pre-winding mode connection.

A projection 408 is provided on the free end of the first arm portion 407 of the mode changing lever 406, and the projection 408 is adapted to be engaged with a projection 416 on one end of the retainer lever 410 when the mode changing lever 406 is in the pre-winding mode position. The retainer lever 410 is supported for rotation on a pin 412 and is clockwisely urged by a coil spring 414. The other end of the retainer lever 410 is adapted to be engaged with said working arm 17 of the torque detecting lever 12.

The second arm portion 409 of the mode changing lever 406 is adapted to be engaged with a downward projection 426 on one end of a charge lever 424 which is supported for rotation on a pin 420 and is urged in the clockwise direction as seen in FIG. 11 by a coil spring 422. The other end 427 of the charge lever 424 is adapted to be engaged with a projection 430 on one end of a charging slider 428. The charging slider 428 is urged toward the backlid 432 by a coil spring 440 and is adapted to slide after a raised portion 434 formed on the backlid 432 when the backlid 432 is closed. The charging slider 428 is provided with a pair of elongated slots 436 and a pair of pins 438 are inserted into the slots 436, whereby the sliding direction and the sliding distance of the slider 428 are determined by the slots 436.

The charging slider 428 is provided with a projection 441 at an intermediate portion. The projection 441 is adapted to be engaged with one end 446 of a charge preventing lever 442, and the other end 448 of the charge preventing lever 442 is adapted to be engaged with a film detecting lever 444. The charge preventing lever 442 is urged in the counterclockwise direction as seen in FIG. 11 by a coil spring 450, and is movable, in response to the movement of the film detecting lever 444, between an engaging position shown in FIG. 11 and a disengaging position shown in FIG. 14. The film detecting lever 444 is supported for rotation on a pin 456 and is urged in the clockwise direction by a coil spring 452. The film detecting lever 444 has a detecting end portion adapted to abut against film in the film feed path.

When the backlid is closed and the film 34 exists in the film feed path in the pre-winding mode state, the mode changing lever 406 is retained in the pre-winding mode position and the mode changing switch 400 makes pre-winding mode connection as shown in FIG. 11.

When the pre-winding of the film 34 is completed and the spool 1 is stopped, the torque detecting lever 12 is rotated in the clockwise direction as seen in FIG. 12, and accordingly the retainer lever 410 is counterclockwisely rotated pushed by the working arm 17 of the torque detecting lever 12 overcoming the force of the spring 414. Therefore, the projection 416 of the retainer lever 410 is disengaged from the projection 408 of the mode changing lever 406 to release it, whereby the mode changing lever 406 is permitted to counterclockwisely rotate under the force of the coil spring 404 and to push the mode changing switch 400 into the photographing mode connection.

When the backlid is opened while the film 34 is in the film feed path and the operational mode is the photographing mode, the film detecting lever 444 is retained in the position shown in FIG. 13 and accordingly the charge preventing lever 442 is retained in the engaging position in which it is engaged with the projection 441 of the charging slider 428 to prevent the charging slider 428 from sliding after the raised portion 434 of the backlid 432, whereby the mode changing section is kept in the photographing mode state. Accordingly the photographing mode can be continued after closure of the backlid.

When all the frames of the film 34 are exposed and the whole film is rewound into the magazine, the film detecting lever 444 is no longer supported by the film 34 and accordingly is permitted to rotate in the clockwise direction under the force of the spring 452, thereby swinging the charge preventing lever 442 to the disengaging position in which it is retracted from the projection 441 of the charging slider 428. When the backlid 432 is subsequently opened, the driving motor 2 is de-energized under the control of the control circuit shown in FIG. 10, thereby permitting removal of the magazine 32. At the same time, the torque detecting lever 12 counterclockwisely rotates under the force of the coil spring 26 and the retainer lever 410 is moved to the position shown in FIG. 14 in which it can be engaged with the mode changing lever 406 to retain the same in the pre-winding mode position. Further, the charging slider 428 slides after the backlid in response to the opening thereof, thereby moving the mode changing lever 406 to the pre-winding mode position by way of the charge lever 424 to change the connection of the mode changing switch 400 to the pre-winding mode connection. The mode changing lever 406 is retained in the pre-winding mode position by the retainer lever 410.

When the backlid is closed after a magazine is loaded, the mode changing lever 406 is moved to the pre-winding mode position whereby the movable contact of the mode changing switch 400 is brought into contact with the pre-winding mode contact R (the pre-winding mode connection), and at the same time, the backlid switch $S_C$ and the film detecting switch $S_F$ are closed. Accordingly, an electric current is supplied to the driving motor 2 in the direction of the arrow A in FIG. 10 to rotate the driving motor 2 in the counterclockwise direction by way of the backlid switch $S_C$, the normally closed contact NC of the relay switch RLS, the pre-winding mode contact R of the mode changing switch 400, and the film detecting switch $S_F$, whereby the pre-winding is performed.

When the pre-winding is completed, the spool 1 is stopped under the tension of the film 34, and the torque detecting lever 12 is rotated in the clockwise direction to counterclockwisely rotate the retainer lever 410, thereby permitting the mode changing lever 406 to move to the photographing mode position as described above. Thus, the movable contact of the mode changing switch 400 is brought into contact with the photographing mode contact T (the photographing mode connection), whereby the relay RL is energized to bring the movable contact of the relay switch RLS into contact with the normally open contact NO thereof since the one-frame switch $S_O$ and the lost-feed switch $S_J$ are closed at the time. Accordingly, an electric current is supplied to the driving motor 2 in the direction opposite to the arrow 2 in FIG. 10 by way of the backlid switch $S_C$, the photographing mode contact T of the mode changing switch 400 and the normally open switch NO of the relay switch RLS, whereby the motor 2 is rotated in the clockwise direction. The driving motor 2 is stopped when the lost-feed switch $S_J$ and the one-frame switch $S_O$ are opened, whereby the film 34 is rewound by substantially preframe-length (the lost-feed) as described above. Thereafter, the one-frame switch $S_O$ is closed in response to shutter release so that the film 34 is rewound into the magazine one frame by one frame each time the film 34 is exposed.

The frame of the film 34 which is exposed to light upon opening of the backlid by mistake can be rewound into the magazine by manually closing the manual rewinding switch $S_A$. When the manual rewinding switch $S_A$ is closed, the relay RL is energized independently of the one-frame switch $S_O$ since the manual rewinding switch $S_A$ is in parallel to the one-frame switch $S_O$, and accordingly the driving motor 2 is energized to rewind the film into the magazine until the film is wholly rewound into the magazine and the film detecting switch $S_F$ is opened.

We claim:

1. A pre-winding type photographic camera capable of receiving a film magazine containing film, comprising:

a backlid movable between an open position and a closed position;

a take-up spool;

motor means for moving the film from the film magazine to the take-up spool during a pre-winding mode and for moving the film from the take-up spool to the film magazine during a photographing mode;

mode changing means for changing the mode of operation of the camera between the pre-winding mode and the photographing mode; the mode changing means including a mode changing member movable between a pre-winding mode position and a photographing mode position, retainer means for selectively engaging the mode changing member and holding the mode changing member in the pre-winding mode position, means for moving the mode changing member into the photographing mode position when the mode changing member is disengaged from the retainer means, means for moving the mode changing member into the pre-winding mode position when the backlid is moved to the open position, and detecting means for detecting when the pre-winding mode is complete and disengaging the retainer means from the mode changing member;

control circuit means for controlling the motor means; the control circuit means including a mode changing switch responsive to the mode changing member, the mode changing switch having a pre-winding mode connection and a photographing mode connection, the pre-winding mode connection being made when the mode changing member is in the pre-winding mode position, the photographing mode connection being made when the mode changing member is in the photographic mode position; the control circuit means also including one-frame switch means for controlling the motor to move the film from the take-up spool to the film magazine by one frame each time the film is exposed, the one-frame switch means being operative when the photographing mode connection is made and being inoperative when the pre-winding mode connection is made; the control circuit means further including magazine switch means having a first position and a second position, the magazine switch means being responsive to insertion and removal of the film magazine and responsive to movement of the backlid, the magazine switch means being placed in the first position when the film magazine is inserted into the camera and when the film magazine is removed from the camera, the magazine switch means being placed in the second position when the backlid is moved to the open position, the first position of the magazine switch means permitting current to flow through the motor means, the second position of the magazine switch means preventing current from flowing through the motor means, the magazine switch means being electrically in series with the motor means when the pre-winding mode connection is made.

2. A pre-winding type photographic camera as defined in claim 1, wherein the magazine switch means is held in the first position by a retainer member that exerts an insubstantial amount of force on the film magazine while the magazine switch means is in the first position.

3. A pre-winding type photographic camera capable of receiving a film magazine containing film, comprising:
a backlid movable between an open position and a closed position;
a take-up spool;
motor means for moving the film from the film magazine to the take-up spool during a pre-winding mode and for moving the film from the take-up spool to the film magazine during a photographing mode;
mode changing means for changing the mode of operation of the camera between the pre-winding mode and the photographing mode; the mode changing means including a mode changing member movable between a pre-winding mode position and a photographing mode position, retainer means for selectively engaging the mode changing member and holding the mode changing member in the pre-winding mode position, means for moving the mode changing member into the photographing mode position when the mode changing member is disengaged from the retainer means, means for moving the mode changing member into the pre-winding mode position when the backlid is moved to the open position, and detecting means for detecting when the pre-winding mode is complete and disengaging the retainer means from the mode changing member;
control circuit means for controlling the motor means; the control circuit means including a mode changing switch responsive to the mode changing member, the mode changing switch having a pre-winding mode connection and a photographing mode connection, the pre-winding mode connection being made when the mode changing member is in the pre-winding mode position, the photographing mode connection being made when the mode changing member is in the photographic mode position; the control circuit means also including one-frame switch means for controlling the motor to move the film from the take-up spool to the film magazine by one frame each time the film is exposed, the one-frame switch means being operative when the photographing mode mode connection is made and being inoperative when the pre-winding mode connection is made; the control circuit means further including magazine switch means having an open position and a closed position, the magazine switch means being responsive to insertion and removal of the film magazine and responsive to movement of the backlid, the magazine switch means being placed in the open position when the film magazine is inserted into the camera and when the film magazine is removed from the camera, the magazine switch means being placed in the closed position when the backlid is moved to the open position; the control circuit means additionally including a film switch having an open position and a closed position, the film switch being in the closed position when film exists between the film magazine and the take-up spool, the film switch being electrically in series with the magazine switch means, the film switch and the magazine switch means being electrically in parallel with the one-frame switch means.

4. A pre-winding type photographic camera as defined in claim 3, wherein the magazine switch means is held in the open position by a retainer member that exerts an insubstantial amount of force on the film magazine while the magazine switch means is in the open position.

5. A pre-winding type photographic camera capable of receiving a film magazine containing film, comprising:
a backlid movable between an open position and a closed position;
a take-up spool;
motor means for moving the film from the film magazine to the take-up spool during the pre-winding mode and for moving the film from the take-up spool to the film magazine during a photographing mode;
mode changing means for changing the mode of operation of the camera between the pre-winding mode and the photographing mode; the mode changing means including a mode changing member movable between a pre-winding mode position and a photographing mode position, retainer means for selectively engaging the mode changing member and holding the mode changing member in the pre-winding mode position, means for moving the mode changing member into the photographing mode position when the mode changing member is disengaged from the retainer means, means for moving the mode changing member into the pre-winding mode position when the backlid is moved to the open position, and detecting means for detecting when the pre-winding mode is complete and disengaging the retainer means from the mode changing member;

wherein the means for moving the mode changing member into the pre-winding mode position includes a first charge member movable in response to movement of the backlid, a second charge member movable in response to movement of the first charge member, and film detecting means for detecting whether film exists between the film magazine and the take-up spool, the film detecting means having means for preventing the first charge member from moving in response to movement of the backlid when film exists between the film magazine and the take-up spool.

* * * * *

UNITED STATES PATENT AND TRADEMARK OFFICE
CERTIFICATE OF CORRECTION

PATENT NO. : 4,586,801

DATED : May 6, 1986

INVENTOR(S) : Tetuo Nishizawa; Seiji Asano; Minoru Ishiguru; Masanoshin Komori; Takashi Tobioka; Toshio Yoshida; Hiroshi Hara It is certified that error appears in the above-identified patent and that said Letters Patent is hereby corrected as shown below:

Please amend Page 1 of the Patent to show both Assignees, as follows:

---Fuji Photo Optical Co., Ltd. and Fuji Photo Film Co., Ltd.---

Signed and Sealed this

Tenth Day of January, 1989

Attest:

DONALD J. QUIGG

*Attesting Officer*  *Commissioner of Patents and Trademarks*